US009678955B2

(12) United States Patent
Yao et al.

(10) Patent No.: US 9,678,955 B2
(45) Date of Patent: Jun. 13, 2017

(54) DATA COLLECTION VISUALIZATION FACILITY FOR CREATING THREE-DIMENSIONAL USER INTERFACES

(71) Applicants: Sheng Yao, Singapore (SG); Lin Cao, Singapore (SG)

(72) Inventors: Sheng Yao, Singapore (SG); Lin Cao, Singapore (SG)

(73) Assignee: SAP SE, Walldorf (DE)

( * ) Notice: Subject to any disclaimer, the term of this patent is extended or adjusted under 35 U.S.C. 154(b) by 170 days.

(21) Appl. No.: 13/951,156

(22) Filed: Jul. 25, 2013

(65) Prior Publication Data

US 2015/0029177 A1   Jan. 29, 2015

(51) Int. Cl.
*G09G 5/00* (2006.01)
*G06F 17/30* (2006.01)
*H04L 29/08* (2006.01)
*G06Q 30/06* (2012.01)
*G06Q 30/02* (2012.01)

(52) U.S. Cl.
CPC ......... *G06F 17/30* (2013.01); *G06Q 30/0281* (2013.01); *G06Q 30/0641* (2013.01); *H04L 67/00* (2013.01); *H04L 67/36* (2013.01)

(58) Field of Classification Search
CPC ......... G06F 17/30; H04L 67/36; H04L 67/00; G06Q 30/0641; G06Q 30/0281; G06T 19/006

USPC .......................................................... 345/633
See application file for complete search history.

(56) References Cited

U.S. PATENT DOCUMENTS

| 8,869,027 | B2 * | 10/2014 | Louch | G06F 3/0481 |
| | | | | 715/700 |
| 9,104,294 | B2 * | 8/2015 | Forstall | G06F 3/0482 |
| 2009/0066712 | A1 * | 3/2009 | Gilger | 345/581 |
| 2009/0240578 | A1 * | 9/2009 | Lee et al. | 705/14 |

OTHER PUBLICATIONS

Zhu, W. Design of the PromoPad: an Automated Augmented Reality Shopping Assistant. ,Dec. 2006, 12th Americas Conference on Information Systems, Acapulco, Mexico, p. 1-16.*

* cited by examiner

*Primary Examiner* — Robert Craddock
(74) *Attorney, Agent, or Firm* — Sterne, Kessler, Goldstein & Fox P.L.L.C.

(57) ABSTRACT

Disclosed herein are system, method, and computer program product embodiments for implementing a data collection visualization facility. An embodiment operates by adding a visualization component to an application, to create a three-dimensional (3D) user interface and implementing a data adaptor associated with the visualization component. This embodiment further implements an event handler configured to function with the visualization component.

24 Claims, 8 Drawing Sheets

DATA COLLECTION VISUALIZATION FACILITY FOR CREATING THREE-DIMENSIONAL USER INTERFACES

BACKGROUND

Background

As users use mobile devices more frequently in their everyday lives, more mobile applications are being developed for these devices. A user interface is an integral part of a mobile application, which, in part, can determine user experience with the mobile application. To improve user experience, there is a need for methods to easily create three-dimensional (3D) user interfaces.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for implementing a data collection visualization facility.

Figure 1:
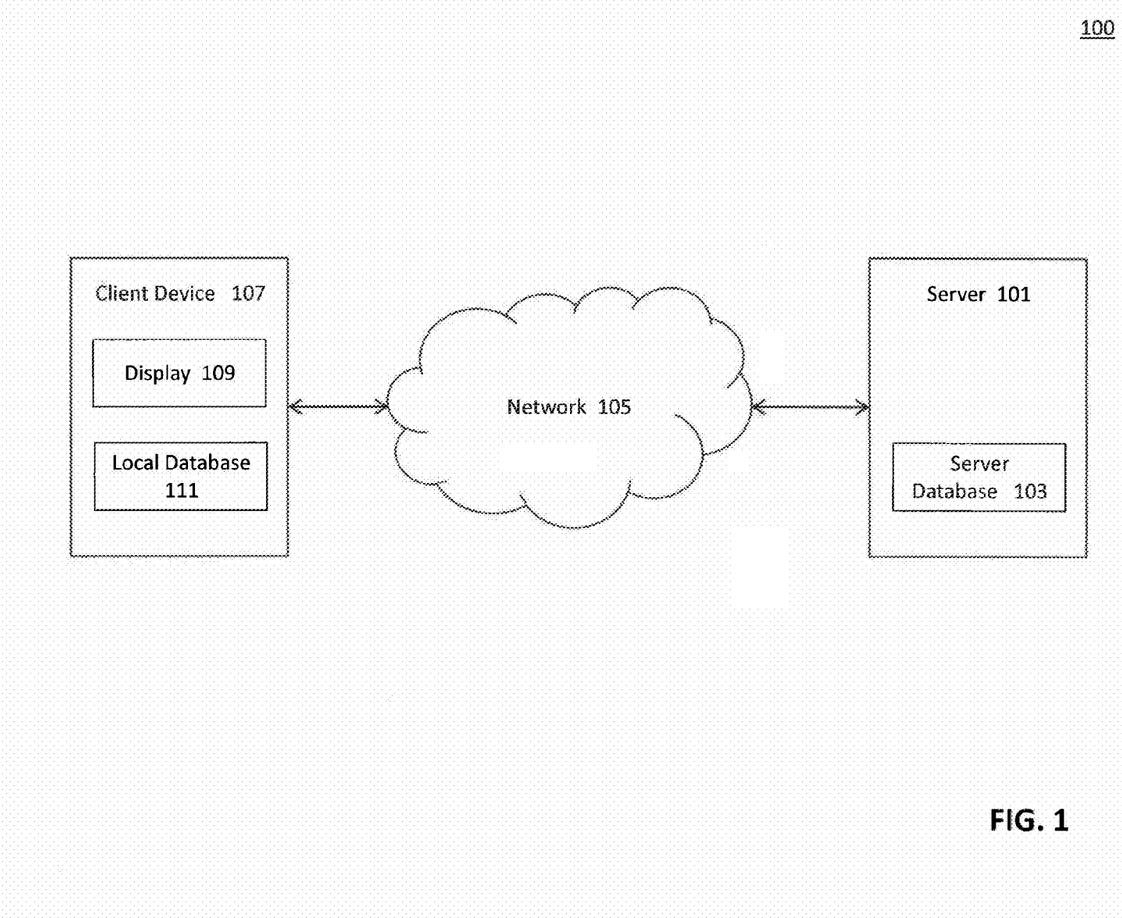
FIG. 1 is a block diagram of a system using a data collection visualization facility, according to an example embodiment.

FIG. 1 is a system 100 for using the data collection visualization facility, in accordance with an example embodiment. System 100 comprises server 101 housing server database 103. Server 101 is connected via network 105 to client device 107. Client device 107 can include local database 111. One skilled in the relevant arts will recognize that network 105 can be one of many different types of networks which are used to establish communications between server 101 and client device 107, including, but not limited to, personal area networks, local area network, mesh network, metropolitan area network, wide area network, mobile network (such as global system for mobile communications, personal communications service, digital advance mobile phone service, etc.), the Internet, a corporate intranet, or the like.

According to one example embodiment, client device 107 can be a mobile device, which includes display 109. In one example, client device 107 includes a set of graphical/visualization components that can allow a user to easily create 3D user interfaces for mobile applications. The 3D effectives are generated and rendered on the client device 107. According to one example, data underlying the visualization components can be collected from server database 103 through network 105. Additionally or alternatively, the underlying data can be retrieved from local database 111 or can be collected through a combination of both. The use of the visualization components advantageously provides a platform for the user to easily create 3D user interfaces and can allow the client device 107 to retrieve data associated with a visualization component when that component is being used. This allows the user to create highly interactive interfaces that improve the user experience, without having to wait for a server to respond to subsequent data requests.

Figure 2:
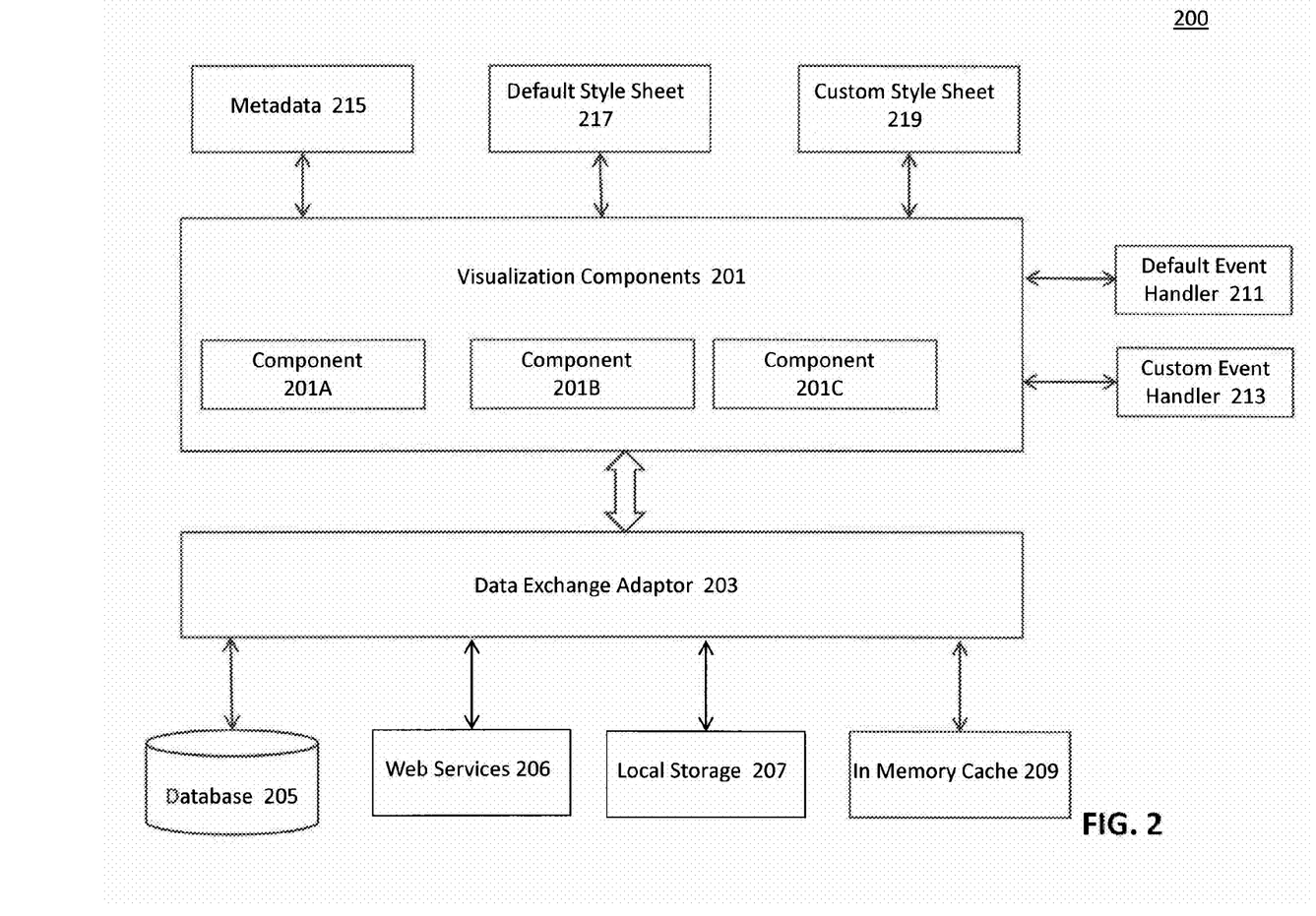
FIG. 2 is a block diagram of an architecture implementing the data collection visualization facility, according to an example embodiment.
Figure 3A:
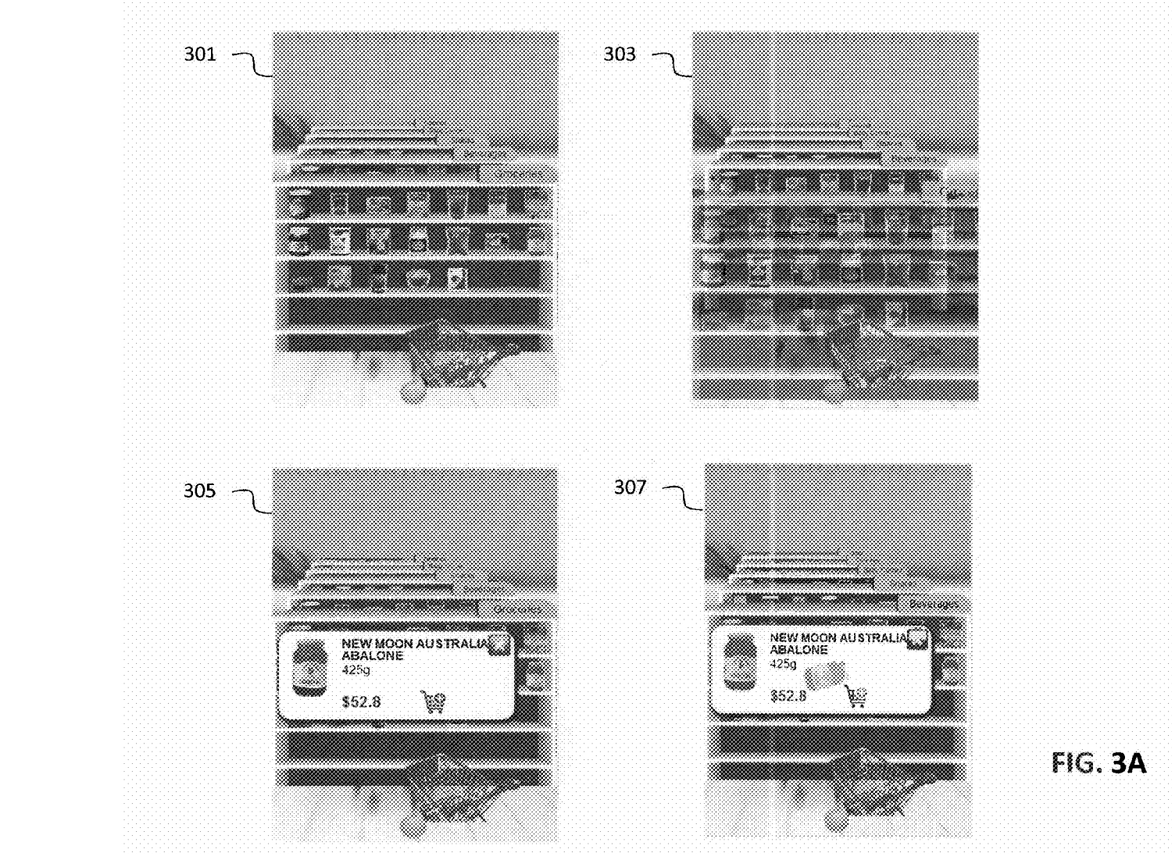
FIGS. 3A and 3B are exemplary interfaces, according to an example embodiment.
Figure 3B:
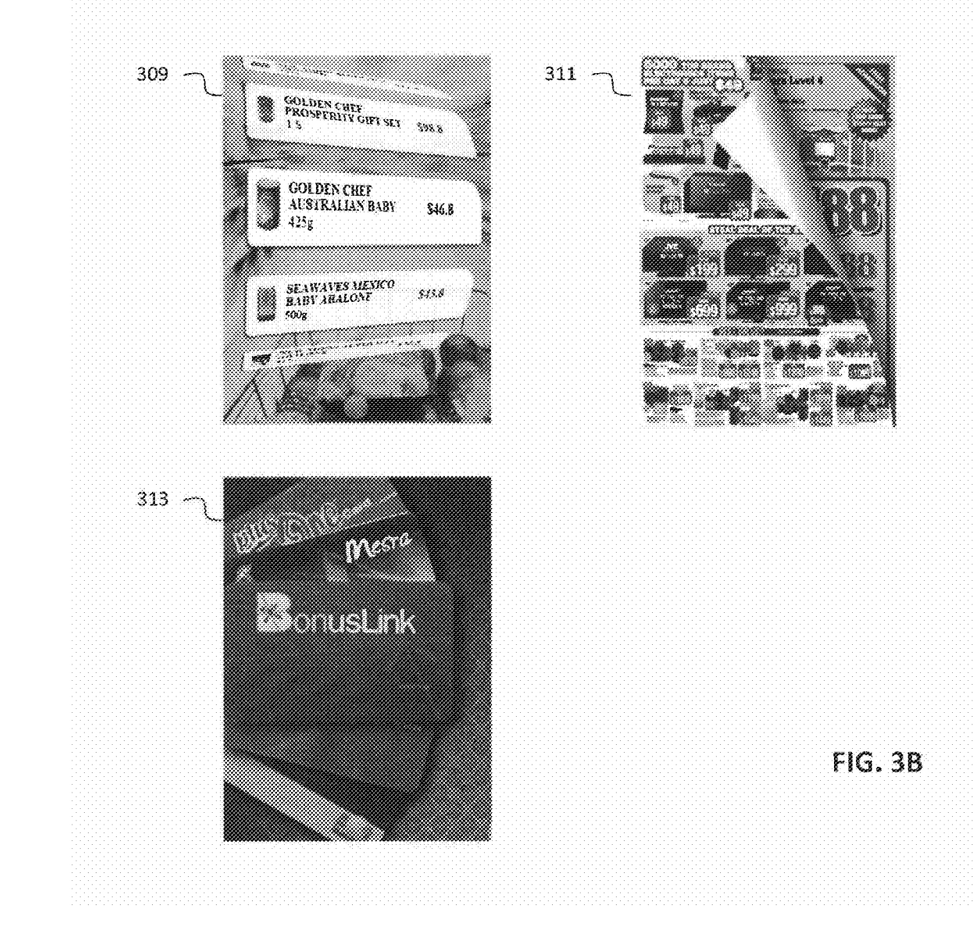

FIG. 2 is a block diagram of an architecture, which implements data collection visualization facility 200, according to an example embodiment. According to one example, data collection visualization facility 200 can be implemented in client device 107. Data collection visualization facility 200 includes visualization components 201, which includes components 201A-201C. Although only three components are shown, visualization components 201 can include any number of components. Components 201A-201C are used to create a 3D interface. According to one example, components 201A-201C can include, but are not limited to, a store visualization component, a shelf visualization component, a page flip visualization component, a card (such a loyalty, credit, debit, etc.) visualization component, shopping cart visualization component, etc., as illustrated in FIGS. 3A and 3B, which are exemplary three-dimensional interfaces. For example, item 301 of FIG. 3A illustrates how shelf visualization components and a shopping cart visualization component are used to create a 3D user interface that can be used with, for example, a shopping mobile application. According to this example, when item 301 is displayed, data associated with the first shelf of item 301 is retrieved and data associated with other shelves are not collected.

Items 309, 311, and 313 of FIG. 3B illustrates further examples of visualization components 201A-201C. For example, item 309 illustrates items included in a shopping cart. Item 311 illustrates a page flip visualization component. And item 313 illustrates card visualization components, such a loyalty, credit, debit, etc.

In addition to pre-defined components, visualization components 201 can include one or more custom type components, which can be defined by a user (such as a mobile application user and/or developer.) For example, a mobile application developer can define visualization type, properties, event handlers, data adaptor, etc. of the custom type components to create a new visualization component.

When a user selects one or more pre-defined or custom-created visualization components needed for a mobile application, the user can add the components (for example, visualization components 201A-201C) to the mobile application by, for example, coding and/or drag and drop. The visualization components 201A-201C can exchange data with, for example, database 205, web services 206 (which can be used, for example, for communication over world wide web), local storage 207, in memory cache 209, server database 103, or a combination thereof, to retrieve data associated the components. According to one example, the data exchange or transfer can be done through data exchange adaptor 203. Each of pre-defined and/or custom-created visualization components 201A-201C include data adaptor information, which determine, for example, data needed for these components and place(s) to retrieve the data from. According to an example, when a visualization component, for example, 201A, is selected, data exchange adaptor 203 is configured to determine data adaptor information associated with visualization component 201A and determine how and from where data associated with visualization component 201A should be retrieved. Further, data exchange adaptor 203 is configured to retrieve the data associated with visualization component 201A for, for example, displaying the data.

According to one example, no encryption is used for data exchange. However, data collection visualization facility 200 is configured to enable the user to customize the data exchange adaptor to use any security mechanism/protocol and/or any optimization method.

Data collection visualization facility 200 can further include default event handler 211 and custom event handler 213. According to one example, default event handler 211 includes pre-defined function(s) associated with an event and custom event handler 213 includes functions that can be defined by a user. According to an example, default event handler 211 can include, but not limited to, functions (which can be defined, for example in a metadata file) that can be triggered when data is loaded, when a user clicks on an item, and when an item moves to a next or previous item.

As an example, item 303 of FIG. 3A illustrates how moving from one shelf to another shelf can be implement using data collection visualization facility 200. When a user chooses to move (using the 3D interface) from the first shelf to the next shelf, a default event handler for moving to next item is invoked to perform function(s) associated with this handler.

As another example, item 305 of FIG. 3A illustrates that when an item on a shelf is selected, a select event handler can be invoked to perform functions, such as, but not limited to, displaying details of the selected item. Additionally or alternatively, a load event handler can be invoked to load the data associated with the selected item using data exchange adaptor 203. Further, item 307 of FIG. 3A illustrates another example, where the selected item is moved to a shopping cart. According to this example, an event handler can be invoked to perform the desired function. Another example of default event handler can include a handler configured to perform collection of credit card information. As understood by a person of ordinary skills in the arts, functions and event handlers discussed above are example and other functions can be performed by the event handlers.

According to an embodiment, if no event handler has been associated with a selected item, an event handler of a parent of the item can be used to handle the event.

The architecture of data collection visualization facility 200 can also include metadata 215, default style sheet 217, and custom style sheet 219. Metadata 215, default style sheet 217, and custom style sheet 219 can include style, design, and/or specification of data structures for visualization components 201, depending on the code (such as Java Script, Extensible Markup Language (XML), etc.) used for generating the 3D user interface using data collection visualization facility 200. In one example, default style sheet 217 can include information associated with pre-defined components. Additionally or alternatively, custom style sheet 219 can be used by the user to define information associated with a custom-created component. As one example, which is discussed in more detail below, style sheet 217 and/or 219 can be used in accordance with movement between components, as shown, for example, in 303 of FIG. 3A.

Figure 4A:
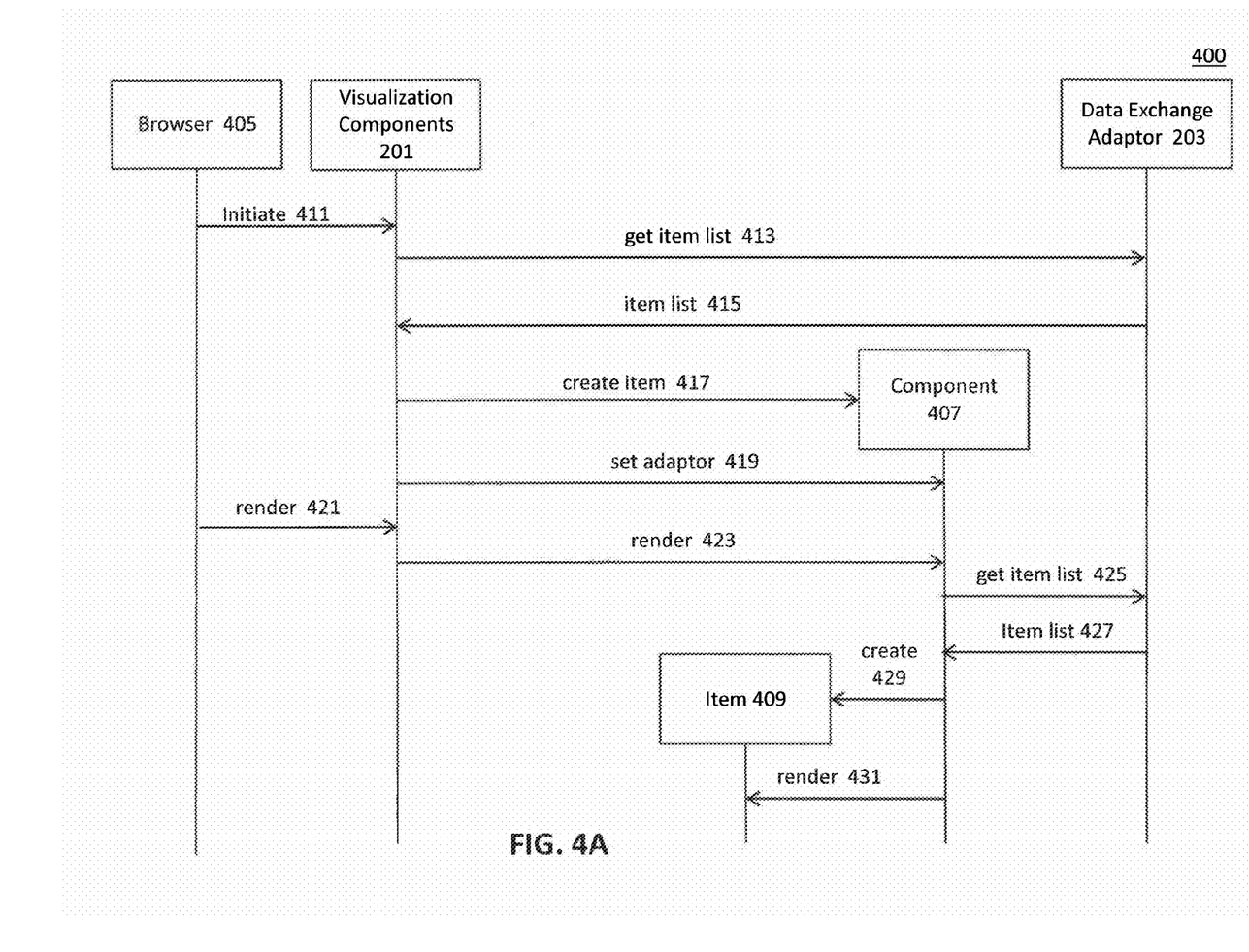
FIGS. 4A and 4B are sequence diagrams, according to an example embodiment.
Figure 4B:
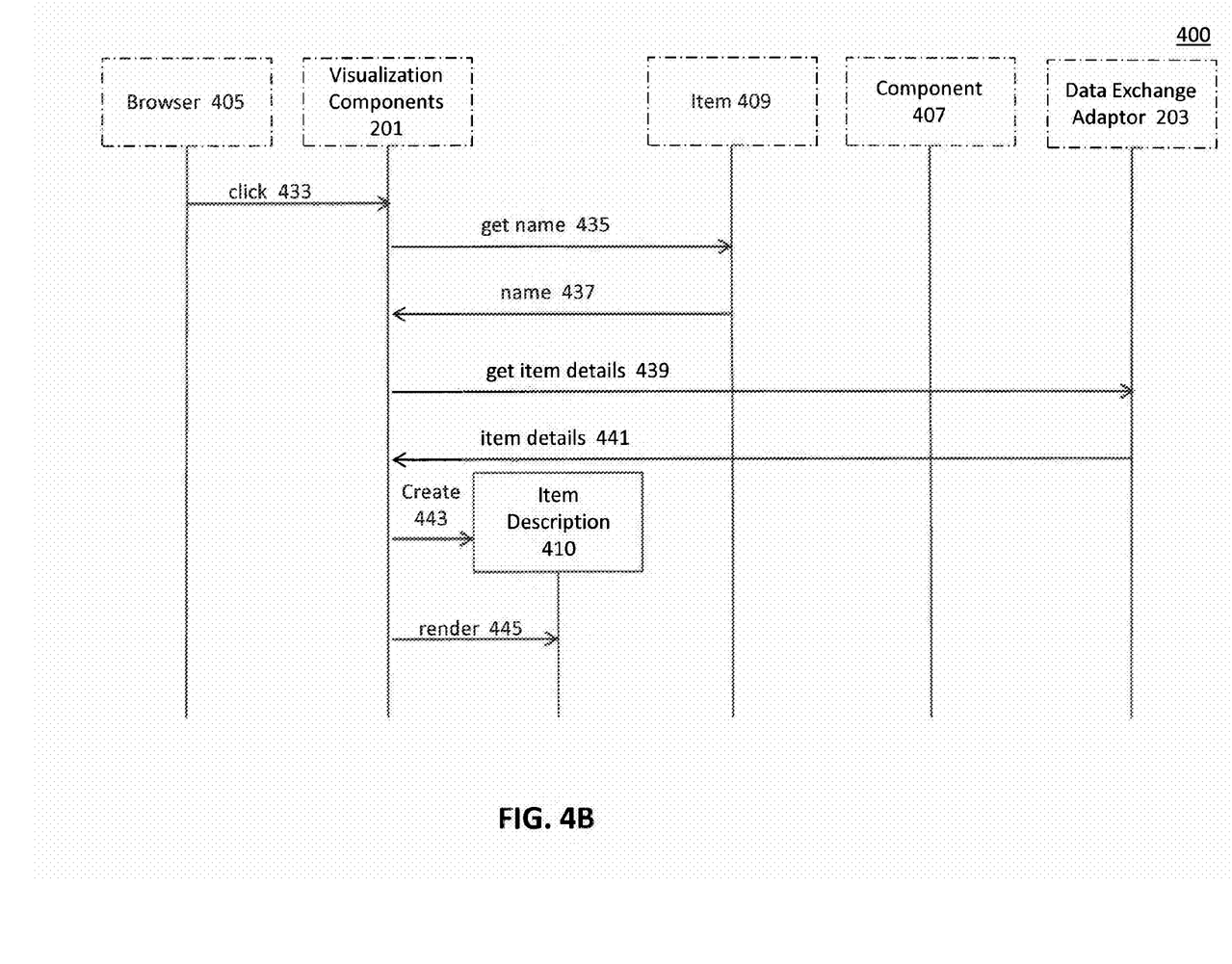

FIGS. 4A and 4B are sequence diagrams that can be performed by data collection visualization facility 200, according to an example embodiment. In this example, sequence diagram 400 is explained in reference to FIGS. 2, 3A, and 3B merely for convenience of discussion. Other systems may be used to perform the method as will be understood by those skilled in the arts. It is to be appreciated not all steps of sequence diagram 400 may be needed, and the steps may not be performed in the same order as shown in FIGS. 4A and 4B.

According to one example, a user can access visualization components 201 through browser 405. Additionally or alternatively, a user can access visualization components 201 through a stand-alone application on a client device (such as a mobile device.) In this example, the user uses browser 203 to create a 3D user interface for shelves of store, such as 301 of FIG. 3A. An initiation message 411 is sent from browser 405 to visualization components 201. According to one example, initiation message 411 can include metadata associated with the store for which the 3D user interface is to be created. Visualization components 201 can send a message 413 to a data exchange adaptor 203 in order to get data, such as list of shelves the store. According to one example, visualization components 201 can parse the metadata associated with the initiation message 411 and can set a data adaptor for the store visualization component to be used for message 413. Depending on, for example, the data adaptor of the store visualization component, data exchange adaptor 203 can get the data requested in message 413 form a local memory, a remote memory, or a combination thereof.

When the requested data is ready, data exchange adaptor 203 can send the data (such as item list) back to visualization components 201 in message 415. Visualization components 201 sends a create item message 417 in order to create shelf visualization components 407 and further sends a set adaptor message 419 to shelf visualization components 407 to set the adaptor data for the created shelves. According to this example, messages 411-419 are used to initialize and generate shelves visualization components 407 in store visualization component. After the visualization component is initialized and generated, visualization components 201 can send an acknowledgment to browser 405 and/or return the control back to browser 405.

Continuing with this example, messages 421-431 are used to render the visualization component. For example, browser 405 can send a render signal 421 to visualization components 201 to render the store visualization component including the shelf visualization components. In one example, in response to message 432, visualization components 201 can send render message 423 to shelf visualization components 407 in order to, for example, draw the shelves, as in, for example, 301 of FIG. 3A. According to one example, all the shelves are drawn, however, only data related to items of the first shelf are retrieved. According to this example, shelf visualization component 407 sends a message 425 to data exchange adaptor 203 to get data associated with the items presented on the first shelf of shelf visualization component 407. Depending on data adaptor associated with shelves visualization component 407, the requested data is retrieved from a local memory, a remote memory, or a combination thereof.

Data exchange adaptor 203 sends a message 427, which includes the requested data. Shelf visualization component 407 creates the items presented on the first shelf following a create message 429 and further shelf visualization component 407 sends a render message 431 to render the shelves and items includes on the first shelf.

Continuing with this example, messages 433-445 are used to handle an event invoked by the user. For example, the user clicks on an item on the first shelf and data collection visualization facility 200 is invoked to display details associated with that item. According to one example, browser 405 send a click message 433 to visualization components 201 to indicate that an onClick event has occurred. This will invoke an event handler associated with the selected item and/or the event. For example, visualization components 201 sends a message 435 to item visualization component 409 and receives message 437, which includes the name of the item. Further, visualization components 201 can send a message 439 to data exchange adaptor 203 to get detail data (such as but not limited to price, size, weight, etc.) Data exchange adaptor 203 retrieves the requested data and sends message 441 to visualization components 201. Visualization component 201 requests that the item description be created and rendered using messages 443 and 445, respectively. This example is shown in 305 of FIG. 3A as the details of an item is created and displayed.

Item 303 of FIG. 3A shows another example of an event to be handled by data collection visualization facility 200. According to this example, a user desires to move from, for example, the first shelf to the next shelf. When the event occurs, an event handler associated with shelf visualization component and/or the event is invoked to display the transition. According to one example, shelf visualization component can include n children (n being a positive integer number): Item 1-Item n, which are the $1^{st}$ to $n^{th}$ child of the shelf visualization component. According to this example a style sheet for these children (which can be stored in default and/or custom style sheets 217 and/or 219) can define the positions of all the children based on their order in, for example, a document object model (DOM) tree. In one example, the position of each child can based on a coordinate system, where the order of children is determined based on, for example, the value of Z-axis. According to this example, Item 1 can be transparent and Item 2 can be at the front (for example, the first shelf of 301 in FIG. 3A.) When the user swipes down on the screen to move closer, Item 1 can be removed from front and be appended to the end of the DOM tree and become the $n^{th}$ child. Item 2 can become the $1^{st}$ child. Therefore, now rules for $1^{st}$ child are applied to Item 2, rules for $2^{nd}$ child are applied to Item 3, . . . . Accordingly, as shown in 303 of FIG. 3A, the first shelf moves away such that the second shelf will be displayed. This change can be performed smoothly within a defined transition time. Similar protocol can be performed when a user moves to previous shelves. Also, in addition to using one axis for move-to-next or move-to-previous events, one or two other axes can be used for events such as, but not limited to, zooming, rotation, etc.

Figure 5A:
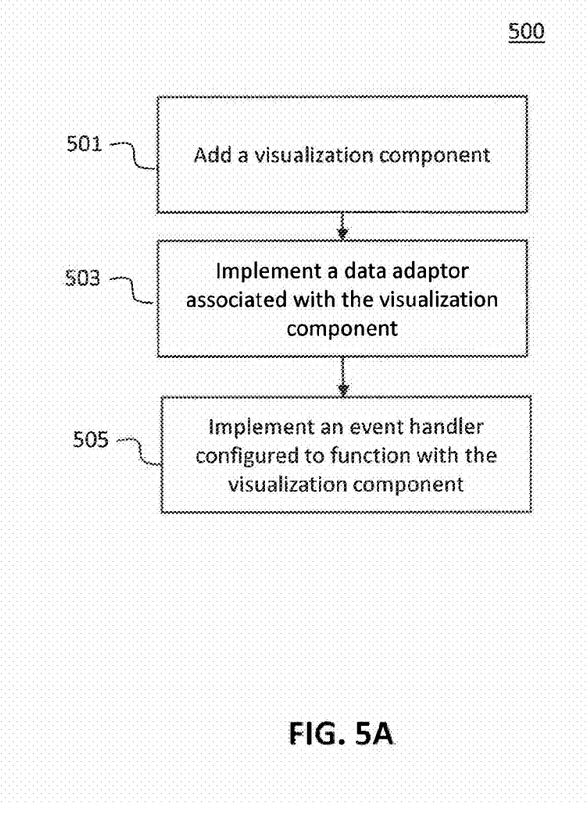
FIGS. 5A and 5B are flowcharts illustrating a process for implementing the data collection visualization facility, according to an example embodiment.
Figure 5B:
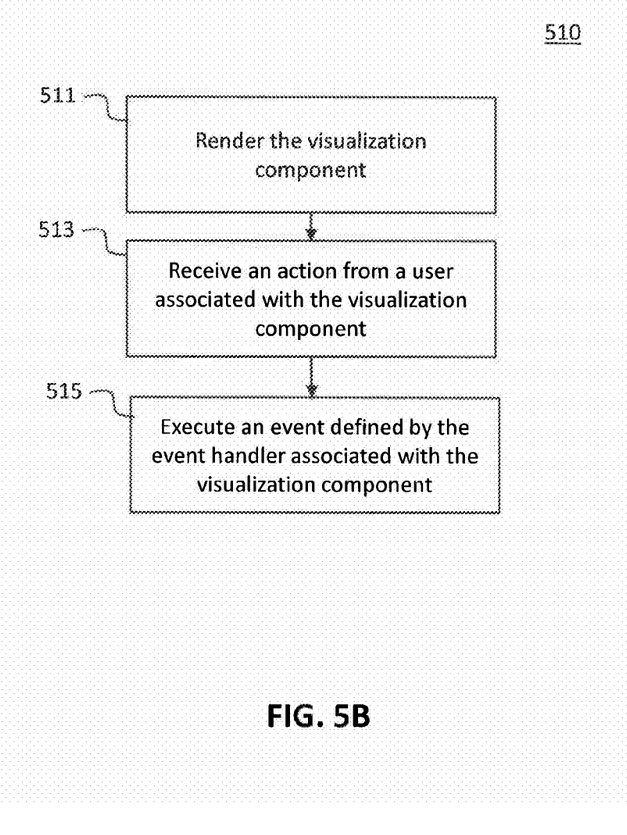

FIGS. 5A and 5B are flowcharts illustrating a process for implementing data collection visualization facility 200, according to an example embodiment. In this example, flowcharts 500 and 510 are explained in reference to FIG. 2 merely for convenience of discussion. Other systems may be used to perform the method as will be understood by those skilled in the arts. It is to be appreciated not all steps of flowcharts 500 and 510 may be needed, and the steps may not be performed in the same order as shown in FIGS. 5A and 5B.

According to example of FIG. 5A, method 500 can be used by data collection visualization facility 200 to easily create a 3D user interface of a mobile application. In step 501, a visualization component (such as any of visualization components 201A-201C) can be added to the 3D user interface. The visualization component can be a pre-defined component and/or a custom-created component. Adding the visualization component to the application can be performed by, but not limited to, coding, drag and drop, declaring a visualization object, etc.

In step 503, a data adaptor associated with the added visualization component can be implemented. The data adaptor can be configured to determine how the visualization component exchanges data with a data source, such as, but not limited to, database 205, web services 206, local storage 207, in memory cache 209, server database 103, or a combination thereof. In step 505, an event handler, which is configured to function with the added visualization component, is implemented.

According to example of FIG. 5B, method 510 can be used by data collection visualization facility 200 to use a visualization component, such as any of visualization components 201A-201C, in a mobile application. According to this example, when a mobile application is executed on a client device (such as, but not limited to, a mobile device), the visualization component(s) associated with the 3D user interface of that application can be rendered in step 511. In step 513, when a user performs an action with the visualization component (such as, but not limited to, selecting an item, moving to next or previous items, etc.) an event handler associated with the visualization component is invoked and executed in step 515.

According to one example, if the action requested by the user requires data collection visualization facility 200 to display details associated with a selected visualization component, step 515 can further include retrieving data associated with the selected visualization component and displaying the retrieved data. Additionally or alternatively, when the action requested by the user requires data collection visualization facility 200 to move to next or previous item, step 515 can further include retrieving data associated with the next or the previous visualization component(s) and displaying those components.

Example Computer System

Figure 6:
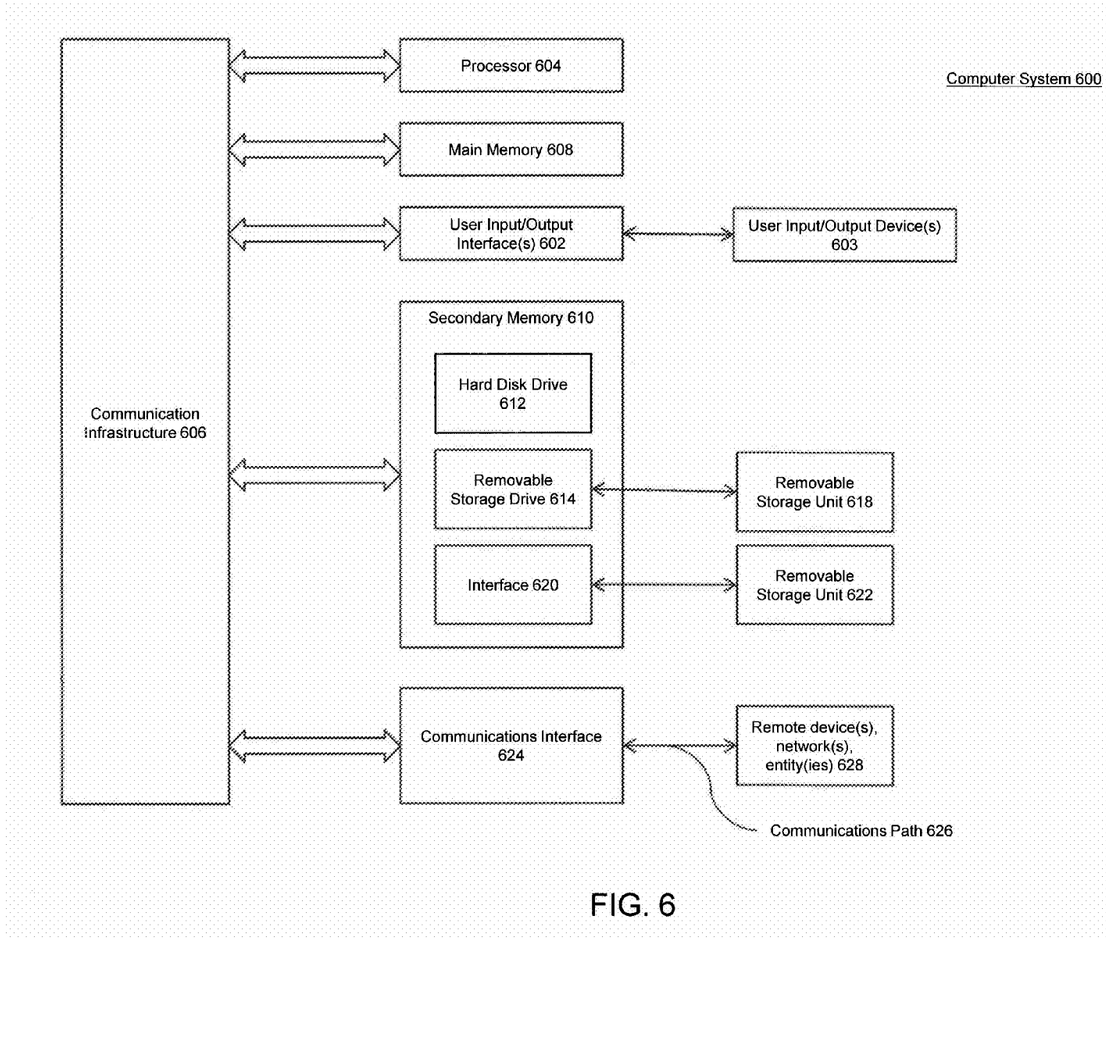
FIG. 6 is an example computer system useful for implementing various embodiments.

Various embodiments can be implemented, for example, using one or more well-known computer systems, such as computer system 600 shown in FIG. 6. Computer system 600 can be any well-known computer capable of performing the functions described herein, such as computers available from International Business Machines, Apple, Sun, HP, Dell, Sony, Toshiba, etc.

Computer system 600 includes one or more processors (also called central processing units, or CPUs), such as a processor 604. Processor 604 is connected to a communication infrastructure or bus 606.

One or more processors 604 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 600 also includes user input/output device(s) 603, such as monitors, keyboards, pointing devices, etc., which communicate with communication infrastructure 606 through user input/output interface(s) 602.

Computer system 600 also includes a main or primary memory 608, such as random access memory (RAM). Main memory 608 may include one or more levels of cache. Main memory 608 has stored therein control logic (i.e., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to an exemplary embodiment, secondary memory 610 may include other means, instrumentalities or other approaches for allowing computer programs d/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

In an embodiment, a tangible apparatus or article of manufacture comprising a tangible computer usable or readable medium having control logic (software) stored thereon is also referred to herein as a computer program product or program storage device. This includes, but is not limited to, computer system 600, main memory 608, secondary memory 610, and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use the disclosed embodiments using data processing devices, computer systems and/or computer architectures other than that shown in FIG. 6. In particular, embodiments may operate with software, hardware, and/or operating system implementations other than those described herein.

Conclusion

While the disclosure has been described herein with reference to exemplary embodiments for exemplary fields and applications, it will be readily apparent to one of ordinary skill in the relevant art that numerous alternatives (involving for example other components, different component arrangements, additional component interactions, etc.) are easily possible. For example, a definition may employ artifacts, paradigms, techniques, technologies, etc. other than XML. For example and inter alia a definition may be created, crafted, etc. by a system administrator, an application developer, etc. using among other things a GUI facility (that may offer among other things a What You See Is What You Get (WYSIWYG) capability), Application Programming Interfaces (APIs), computer code libraries, etc.

Various of the interactions that were described above (e.g., between a Wireless Device (WD) and a back-end system) may optionally contain any combination of one or more of information elements (such as for example a relevant or applicable factoid, a piece of product information, etc.), advertisements, promotional items, coupons, vouchers, surveys, questionnaires, gift cards, retailer credits, etc. Such material may be selected statically or randomly (from for example a repository of defined material), may be location-based (for example, selected from a pool of available material based on possibly inter alia information about the current physical location of a user's WD, etc.

Repositories that may be employed during the above activities may encompass among other things any combination of one or more of conventional Relational Database Management Systems (RDBMSs), Object Database Management Systems (ODBMS), in-memory Database Management Systems (DBMS), equivalent data storage and management facilities, etc.

Various of the interactions that were described above (e.g., between a WD and a back-end system) may optionally leverage, reference, etc. information on the current physical location of a user's WD as obtained through inter alia a one or more of a Location-Based Service (LBS) facility, a Global Positioning System (GPS) facility, etc. to among other things enhance security, provide more applicable or appropriate information, etc.

A data collection visualization display may incorporate, leverage, etc. any number of static and/or dynamic display artifacts such as icons, symbols, decorations, connectors, colors, fonts, labels, etc. and may optionally include inter alia information elements (such as for example a relevant or applicable factoid, a piece of product information, etc.), advertisements, promotional items, coupons, vouchers, surveys, questionnaires, gift cards, retailer credits, etc.

A WD user may optionally save, checkpoint, etc. aspects of some or all of a data collection visualization display (e.g., layout, arrangement, node data values, etc.). Such an action may optionally capture a range of values (such as for example a name, a date and time, etc.) and may employ storage, space, etc. on any combination of one or more of inter alia a WD and/or one or more back-end servers. Aspects of a save, checkpoint, etc. operation may optionally be retrieved, recovered, etc. at a later time.

A WD user may optionally share, convey, send, etc. aspects of some or all of a data collection visualization display (e.g., layout, arrangement, node data values, etc.) to among other things another WD.

Various of the interactions that were described above (e.g., between a WD and a back-end system) may among other things optionally employ any combination of one or more of inter alia a (Short Message Service (SMS), Multimedia Message Service (MMS), Internet Protocol (IP) Multimedia Subsystem (IMS), etc.) message exchange, a Wireless Application Protocol (WAP) exchange, a structured or an unstructured data transfer, a data transfer operation atop one or more proprietary or standards-based protocols, an Electronic Message (E-Mail) exchange, an Instant Messaging (IM) exchange, Wi-Fi, a Near Field Communication (NFC) exchange, etc.

The universe of sources from which a data collection visualization display may draw, pull, etc. data is dynamically extensible and may comprise inter alia any combination of one or more of local (e.g., resident on a WD) and/or remote (e.g., resident on one or more back-end servers) environments.

A Data Exchange Adapter is flexible, extensible, and dynamically configurable. For example and inter alia as new data sources are identified, included, etc. the Data Exchange Adapter component may be modified, added to, etc. to seamlessly support the new data sources.

Any specific XML document structure, content, format, etc. that was depicted above is illustrative only and it will be readily apparent to one or ordinary skill in the art that numerous alternative arrangements, elements, structures, etc. are easily possible.

It is to be appreciated that the Detailed Description section, and not the Summary and Abstract sections (if any), is intended to be used to interpret the claims. The Summary and Abstract sections (if any) may set forth one or more but not all exemplary embodiments of the disclosure as contemplated by the inventor(s), and thus, are not intended to limit the disclosure or the appended claims in any way.

While the disclosure has been described herein with reference to exemplary embodiments for exemplary fields and applications, it should be understood that the disclosure is not limited thereto. Other embodiments and modifications thereto are possible, and are within the scope and spirit of the disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments Whether or not explicitly mentioned or described herein.

The breadth and scope of the disclosure should not be limited by any of the above-described exemplary embodiments, but should be defined only in accordance with the following claims and their equivalents.

What is claimed is:

1. A computer-implemented method, comprising:

presenting, by at least one processor of a mobile device, a set of available visualization components in a browser, wherein the set of available visualization components are stored on the mobile device;

setting, by the at least one processor, data adaptor information of a selected visualization component in an application, wherein the data adaptor information comprises:

a data structure for the application to display the selected visualization components as a user-interface object, and a data source from which to retrieve detail data associated with the selected visualization component, wherein the data adaptor information is configured to be retrieved by a data exchange adaptor, and wherein the data exchange adaptor is configured to retrieve the detail data from the data source;

and invoking, by the at least one processor; an event handler configured to cause the selected visualization component to perform operations comprising:

receiving the detail data from the data exchange adaptor or from the data source, and rendering the user-interface object on a display, wherein the rendering is based on the data adaptor information of the selected visualization component, and wherein the rendering is further based on the detail data received.

2. The method of claim 1, further comprising:

defining, by the at least one processor, one or more parameters associated with the visualization component.

3. The method of claim 2, wherein the one or more parameters include visualization type, item, the data exchange adaptor, and the event handler.

4. The method of claim 1, further comprising:

executing, by the at least one processor, the application on a mobile client device; and executing, by the at least one processor, an event defined by the event handler associated with the visualization component when an action on the rendered visualization component is detected.

5. The method of claim 4, further comprising:

retrieving, by the at least one processor, event data associated with the visualization component when the event is executed.

6. The method of claim 5, wherein the retrieving further comprising:

retrieving, by at least one processor, the event data associated with the visualization component from at least one of a local database and a remote database.

7. The method of claim 1, further comprising:

defining, by the at least one processor, a security protocol used for retrieving data associated with the visualization component.

8. The method of claim 1, wherein the user interface object comprises a three-dimensional (3D) user interface object.

9. The method of claim 1, wherein the visualization component is configured to be defined by a developer, an end user, or both.

10. A system comprising:

a memory at a mobile device; and at least one processor at the mobile device coupled to the memory and configured to:

present a set of available visualization components in a browser, wherein the set of available visualization components are stored on the mobile device;
set data adaptor information of a selected visualization component in an application, wherein the data adaptor information comprises:
a data structure for the application to construct the selected visualization component as a user-interface object, and
a data source from which to retrieve detail data associated with the selected visualization component,
wherein the data adaptor information is configured to be retrieved by a data exchange adaptor, and
wherein the data exchange adaptor is configured to retrieve the described data structure from the data source;
and
invoke an event handler configured to cause the selected visualization component to perform operations comprising:
receiving the detail data from the data exchange adaptor or from the data source, and
rendering the user-interface object on a display, wherein the rendering is based on the data adaptor information of the selected visualization component, and wherein the rendering is further based on the detail data received.

11. The system of claim 10, the at least one processor further configured to:
define one or more parameters associated with the visualization component.

12. The system of claim 11, wherein the one or more parameters include visualization type, item, the data exchange adaptor, and the event handler.

13. The system of claim 10, the at least one processor further configured to:
execute the application on a mobile client device; and
execute an event defined by the event handler associated with the visualization component when an action on the rendered visualization component is detected.

14. The system of claim 13, the at least one processor further configured to:
retrieve event data associated with the visualization component when the event is executed.

15. The system of claim 14, wherein to retrieve the at least one processor is configured to:
retrieve the event data associated with the visualization component from at least one of a local database and a remote database.

16. The system claim 9, the at least one processor further configured to:
define a security protocol used for retrieving data associated with the visualization component.

17. The system of claim 10, wherein the user interface object comprises a three-dimensional (3D) user interface object.

18. The system of claim 10, wherein the visualization component is configured to be defined by a developer, an end user, or both.

19. A non-transitory computer-readable storage medium having instructions stored thereon that, when executed by at least one computing device of a mobile device, causes the at least one computing device to perform operations comprising:
presenting, by at least one processor of a mobile device, a set of available visualization components in a browser, wherein the set of available visualization components are stored on the mobile device;
setting data adaptor information of a selected visualization component in an application, wherein the data adaptor information comprises:
a data structure for the application to construct the selected visualization component as a user-interface object, and
a data source from which to retrieve detail data associated with the selected visualization component,
wherein the data adaptor information is configured to be retrieved by a data exchange adaptor, and
wherein the data exchange adaptor is configured to retrieve the described data structure from the data source;
and
invoking an event handler configured to cause the selected visualization component to perform operations comprising:
receiving the detail data from the data exchange adaptor or from the data source, and
rendering the user-interface object on a display, wherein the rendering is based on the data adaptor information of the selected visualization component, and wherein the rendering is further based on the detail data received.

20. The non-transitory computer-readable storage medium of claim 19, the operations further comprising:
defining one or more parameters associated with the visualization component, wherein the one or more parameters include visualization type, item, the data exchange adaptor, and the event handler.

21. The non-transitory computer-readable storage medium of claim 19, the operations further comprising:
executing the application on a mobile client device;
executing an event defined by the event handler associated with the visualization component when an action on the rendered visualization component is detected; and
retrieving event data associated with the visualization component when the event is executed.

22. The non-transitory computer-readable storage medium of claim 21, wherein the retrieving further comprising:
retrieving the event data associated with the visualization component from at ast one of a local database and a remote database.

23. The non-transitory computer-readable storage medium of claim 19, wherein the user interface object comprises a three-dimensional (3D) user interface object.

24. The non-transitory computer-readable storage medium of claim 19, wherein visualization component is configured to be defined by a developer, an end user, or both.

* * * * *